US012758469B2

(12) United States Patent
Feng et al.

(10) Patent No.: US 12,758,469 B2
(45) Date of Patent: Oct. 13, 2026

(54) REUSABLE ACTUATOR

(71) Applicant: MicroMED Co., Ltd., New Taipei City (TW)

(72) Inventors: Chia-Chi Feng, New Taipei City (TW); Po-Ying Li, New Taipei City (TW); Hong Jun Yeh, New Taipei City (TW); Kuang-Hsiang Cheng, New Taipei City (TW)

(73) Assignee: MicroMED Co., Ltd., New Taipei City (TW)

( * ) Notice: Subject to any disclaimer, the term of this patent is extended or adjusted under 35 U.S.C. 154(b) by 271 days.

(21) Appl. No.: 18/510,872

(22) Filed: Nov. 16, 2023

(65) Prior Publication Data

US 2024/0156683 A1 May 16, 2024

Related U.S. Application Data

(60) Provisional application No. 63/425,910, filed on Nov. 16, 2022.

(51) Int. Cl.
*A61J 1/20* (2006.01)

(52) U.S. Cl.
CPC .................................... *A61J 1/20* (2013.01)

(58) Field of Classification Search
CPC .......... A61J 1/20; A61M 5/2046; A61M 5/20; A61M 5/31578; A61M 2205/8218; A61M 2205/8281
See application file for complete search history.

(56) References Cited

U.S. PATENT DOCUMENTS

| | | | | | |
|---|---|---|---|---|---|
| 4,643,309 | A * | 2/1987 | Evers | A61J 1/06 215/48 |
| 2007/0175538 | A1* | 8/2007 | Rothbauer | B65B 3/003 141/59 |
| 2010/0191182 | A1* | 7/2010 | Smith | A61J 1/2096 604/87 |
| 2018/0010512 | A1* | 1/2018 | Kemmerling | F02D 23/02 |
| 2019/0167906 | A1* | 6/2019 | Auld | A61M 5/322 |
| 2021/0213201 | A1* | 7/2021 | Meyers | A61M 5/2448 |
| 2022/0134072 | A1* | 5/2022 | Kosel | A61M 5/2046 604/506 |
| 2022/0152290 | A1* | 5/2022 | Li | A61M 5/14526 |

FOREIGN PATENT DOCUMENTS

| | | | | |
|---|---|---|---|---|
| KR | 20060014706 A * | 2/2006 | | F01N 3/101 |

* cited by examiner

*Primary Examiner* — Rebecca E Eisenberg
*Assistant Examiner* — Kate Elizabeth Strachan
(74) *Attorney, Agent, or Firm* — Birch, Stewart, Kolasch & Birch, LLP

(57) ABSTRACT

Disclosed is a reusable actuator for use with a drug container including a stopper comprising a container having a closed end, an open end, and a sidewall extending therebetween in a longitudinal direction, an electrode disposed inside the container for use in generating a gas, an actuating element disposed at and closing the open end of the container, the actuating element and the container defining an actuator interior, wherein the actuating element is movable relative to the container in the longitudinal direction by a gas pressure of the gas in the actuator interior, such that the actuating element applies a force to the stopper to cause a drug delivery from the drug container, and a retracting mechanism for use in removing the gas to assist the actuating element's retraction for reuse.

17 Claims, 4 Drawing Sheets

REUSABLE ACTUATOR

CROSS REFERENCE

This Non-provisional application claims the priority under 35 U.S.C. § 119(e) on U.S. Patent Provisional Application No. 63/425,910 filed on Nov. 16, 2022, the entire contents of which are hereby incorporated by reference.

FIELD OF THE INVENTION

The disclosure relates to a reusable actuator. More particularly, the disclosure relates to a reusable actuator for use with a drug container and suitable to cause a drug delivery from the drug container.

BACKGROUND OF THE INVENTION

A miniature actuator is required in a miniature or handheld drug delivery system or device capable of automatically or semi-automatically delivering a drug. However, conventional miniature actuators are basically non-reusable in the sense that after an actuator accomplishes the delivery of a dose and is in an "extended state," it must be manually reset or "pushed" back to a "compressed state" for the delivery of another dose. Accordingly, there is a need for a reusable actuator for use in the above-described drug delivery.

SUMMARY OF THE INVENTION

In one aspect, the present invention provides a reusable actuator for use with a drug container including a stopper. The reusable actuator comprises a container, an electrode, an actuating element, and a retracting mechanism. The container has a closed end, an open end, and a sidewall extending between the closed and open ends in a longitudinal direction. The electrode is disposed inside the container for use in generating a gas. The actuating element is disposed at and closing the open end of the container. The actuating element and the container define an actuator interior. In addition, the actuating element is movable relative to the container in the longitudinal direction by a gas pressure of the gas in the actuator interior, such that the actuating element applies a force to the stopper to cause a drug delivery from the drug container. The retracting mechanism is for use in removing the gas to assist the actuating element's retraction for reuse.

The present invention also contemplates using the reusable actuator to withdrawing fluid (e.g., blood) from a subject into a storage container.

In some embodiments, the actuating element is a balloon or has a bellow structure.

In some embodiments, at least part of the actuating element is sleeved inside the container of the reusable actuator.

In some embodiments, the actuating element has a telescopic structure. The telescopic structure includes a plurality of segments configured to extend and retract telescopically with respect to one another.

In some embodiments, the container of the reusable actuator is a cylindrical container, and the actuating element is a rod or has a tubular structure. At least part of the rod or tubular structure is sleeved inside the container.

In some embodiments, the reusable actuator further comprises an O-ring sealably disposed between an outermost segment of the plurality of segments and the container of the reusable actuator.

In some embodiments, the reusable actuator further comprises an O-ring sealably disposed between the rod or tubular structure and the container of the reusable actuator.

In some embodiments, the retracting mechanism includes a valve for releasing the gas in the actuator interior.

In some embodiments, the retracting mechanism includes a gas converting member disposed in the actuator interior.

In some embodiments, the gas converting member includes a gas converting catalyst. In some embodiments, the gas converting catalyst is coated on the container, the actuating element, or both.

In some embodiments, the gas converting member is a platinum foam.

In some embodiments, the retracting mechanism includes a resilient member for assisting the retraction of the plurality of segments for reuse.

In some embodiments, the retracting mechanism includes a resilient member for assisting the retraction of the rod or tubular structure for reuse.

According to the present invention, the resilient member may be disposed in or outside the actuator interior. In some embodiments, the resilient member is a spring.

In another aspect, the present invention provides a drug delivery device which comprises a reusable actuator as described above and the drug container. The drug container further includes a housing, and the stopper is disposed within the housing. The container of the reusable actuator is connected to the housing with the actuating element of the reusable actuator abuttedly connected to the stopper of the drug container.

In some embodiments, the container of the reusable actuator is so connected to the housing that when the actuating element applies the force to the stopper to cause the drug delivery from the drug container, there is substantially no relative movement between the container of the reusable actuator and the housing.

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DESCRIPTION OF THE INVENTION

The following description is merely intended to illustrate various embodiments of the invention. As such, specific embodiments or modifications discussed herein are not to be construed as limitations to the scope of the invention. It will be apparent to one skilled in the art that various changes or equivalents may be made without departing from the scope of the invention.

In order to provide a clear and ready understanding of the present invention, certain terms are first defined. Additional definitions are set forth throughout the detailed description. Unless defined otherwise, all technical and scientific terms used herein have the same meanings as is commonly understood by one of skill in the art to which this invention belongs.

As used herein, the singular forms "a", "an", and "the" include plural referents unless the context clearly dictates otherwise. Thus, for example, reference to "a component" includes a plurality of such components and equivalents thereof known to those skilled in the art.

As used herein, the term "comprise" or "comprising" is generally used in the sense of include/including which means permitting the presence of one or more features, ingredients or components. The term "comprise" or "comprising" encompasses the term "consists" or "consisting of."

Figure 1:
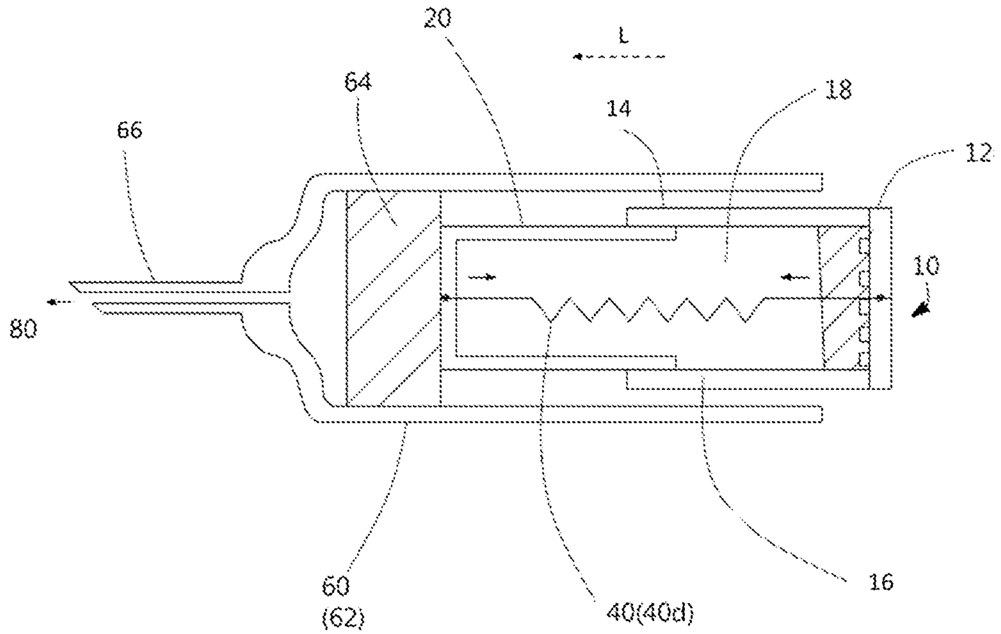
FIG. 1 is a schematic diagram of a reusable actuator and a drug container according to one embodiment of the present invention.

As shown in FIG. 1, provided is a reusable actuator 1 for use with a drug container 60 including a stopper 64. The reusable actuator 10 comprises a container 10, an electrode 70, an actuating element 20 and a retracting mechanism 40.

The container 10 has a closed end 12, an open end 14, and a sidewall 16. The sidewall 16 extends between the closed end 12 and the open end 14 in a longitudinal direction L.

The electrode 70 is disposed inside the container 10 for use in generating a gas. The electrode 70 is preferably disposed at the closed end 12 of the container 10. The electrode 70 is a component of an electrochemical pump. For example, a super hydrophilic material 75 (see FIGS. 2-4) may be added to the container 10 in contact with the electrode 70 and together function as an electrochemical pump. The reusable actuator 1 may comprise a plurality of electrodes or a planar electrode, for generating the gas. According to one embodiment of the present invention, the planar electrode is a porous electrode.

The actuating element 20 is disposed at the open end 14 and closing the open end 14 of the container 10. The actuating element 20 and the container 20 defines an actuator interior 18. The actuating element 20 is movable relative to the container 10 in the longitudinal direction L by a gas pressure of the gas in the actuator interior 18, such that the actuating element 20 applies a force to the stopper 64 to cause a drug delivery 80 from the drug container 60 though a needle 66.

The actuating element 20 may be a balloon or has a bellow structure. In such embodiments, the balloon would be inflated or the bellow structure would be extended by the gas pressure and apply the force to the stopper 64 to cause the drug delivery 80. In some embodiment, the actuating element 20 is made of a sturdy material (e.g., stainless steel) and having tubular structure which includes an open end and a closed end, and the bellow structure is formed at the open end of the tubular structure and is connected to the open end 14 and closing the open end 14 of the container 10.

In some embodiments, at least part of the actuating element 20 is sleeved inside the container 10. For example, the actuating element 20 is made of a sturdy material (e.g., stainless steel) and having tubular structure which includes an open end and a closed end, and actuating element 20 is partly sleeved inside the container 10 at the open end of actuating element 20.

According to certain preferred embodiments, the actuating element 20 may have a telescopic structure. The telescopic structure comprises a plurality of segments, which are configured to extend and retract telescopically with respect to one another.

According to certain preferred embodiments, the container 10 is a cylindrical container and the actuating element 20 is a rod or has a tubular structure, and at least part of the rod or tubular structure is sleeved inside the container 10.

The retracting mechanism 40 is used in removing the gas to assist retraction of the actuating element 20 for reuse.

Figure 2:
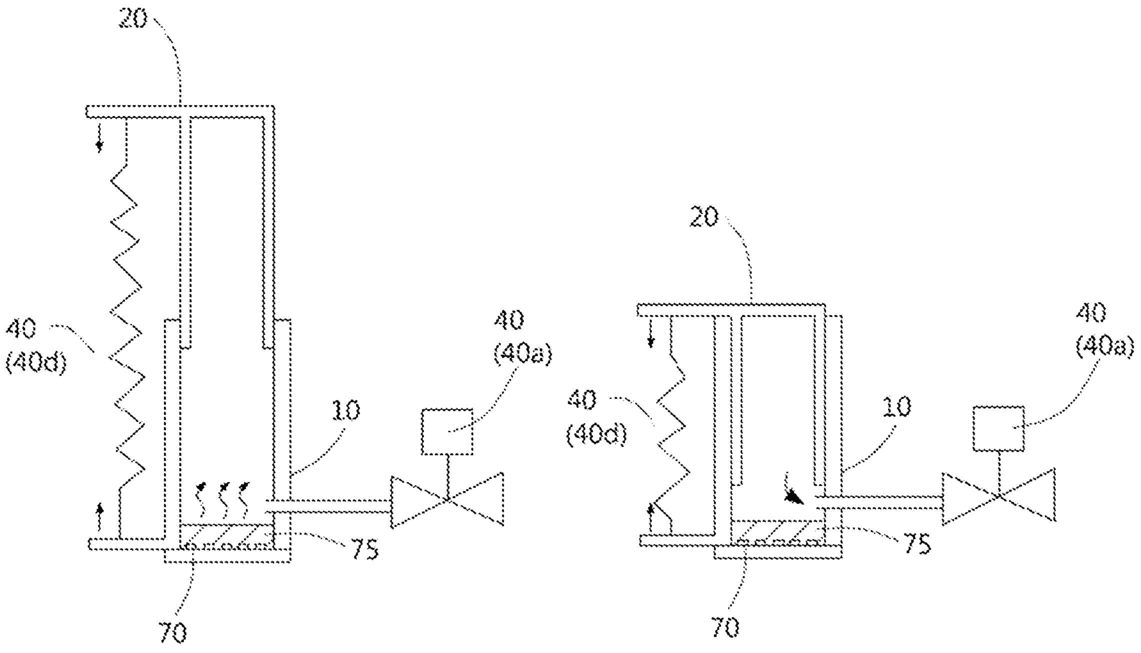
FIG. 2 illustrates a retracting mechanism of a reusable actuator according to one embodiment of the present invention.
Figure 3:
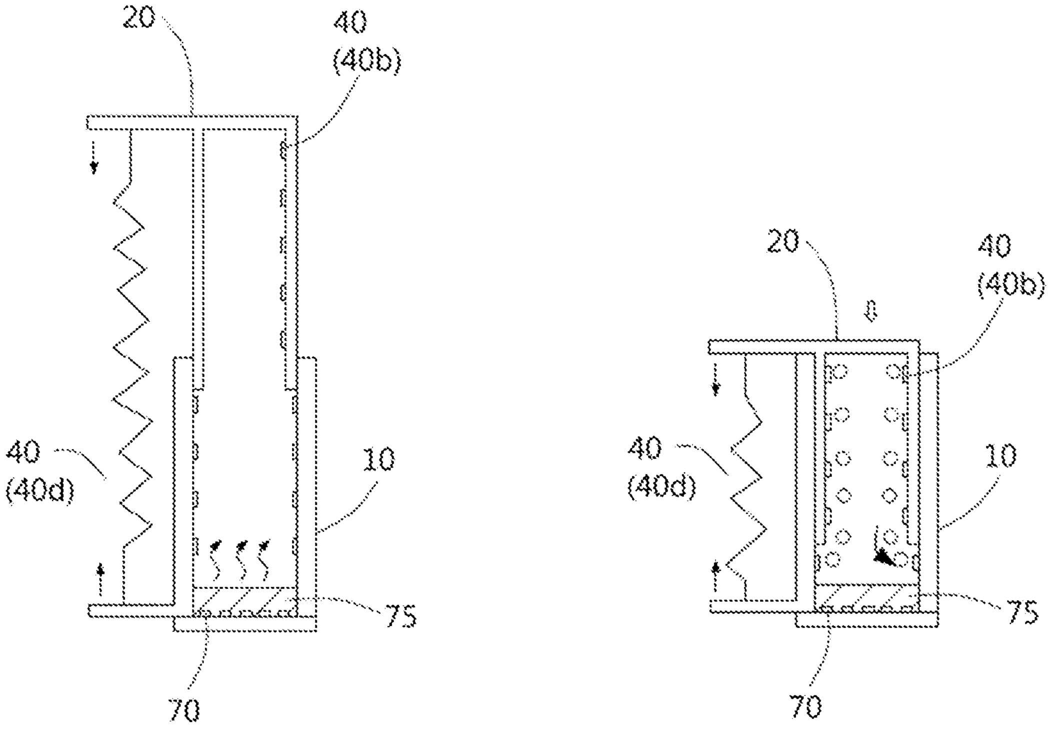
FIG. 3 illustrates a retracting mechanism of a reusable actuator according to another embodiment of the present invention.

As shown in FIG. 2 and FIG. 3, the retracting mechanism 40 may include a resilient member **40*d*. For example, the resilient member 40*d* is a spring, with one end fixed to the container 10 and the other fixed to the actuating element 20. The resilient member may be disposed in the actuator interior 18 (see FIG. 1) or disposed outside the actuator interior (see FIGS. 2 and 3**).

Please refer to FIG. 2 again. The retracting mechanism 40 may further include a valve **40*a*** for releasing the gas.

Figure 4:
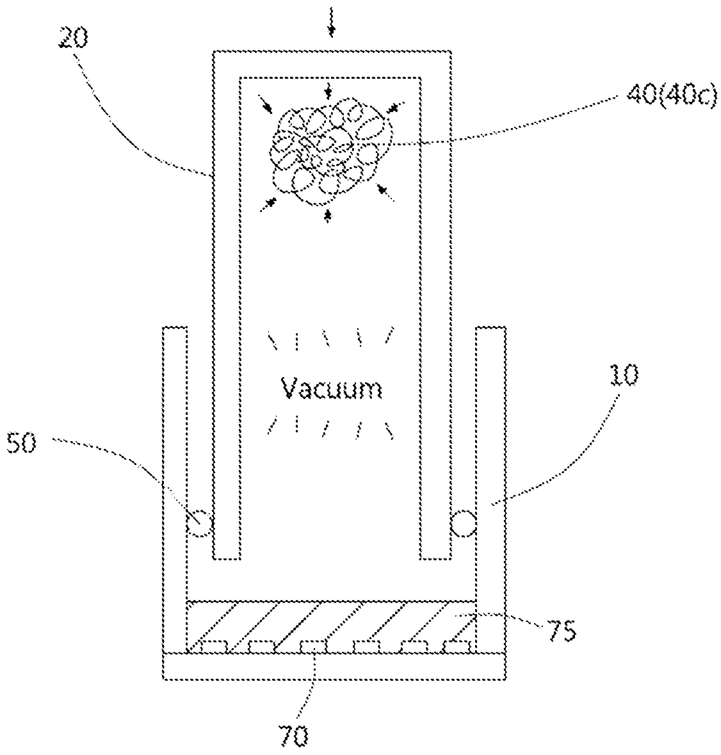
FIG. 4 illustrates a retracting mechanism of a reusable actuator according to another embodiment of the present invention.

On the other hand, the retracting mechanism 40 may also include a gas converting member **40*b* disposed in the actuator interior 18. For example, the gas converting member 40*b* is a gas converting catalyst. In such embodiments, the gas converting member 40*b* may be coated on an interior side of the container 10, the actuating element 20, or both (see FIG. 3). Referring to FIG. 4, in some other embodiments, the gas converting member 40*b* is a platinum foam 40*c***.

Please refer to FIGS. 1 and 4 together. In embodiments where the container 10 is a cylindrical container and the actuating element 20 is a rod or has a tubular structure, the reusable actuator 1 may include an O-ring 50 sealably disposed between the rod or tubular structure and the container 10. Further, in embodiments where the actuating element has a telescopic structure, an O-ring may be sealably disposed between an outermost segment of the plurality of segments of the telescopic structure and the container 10.

Please refer to FIG. 1 again. Preferably, the container 10 of the reusable actuator 1 is connected to the housing 62 of the drug container 60, in such a way that when the actuating element 20 applies the force to the stopper 64 to cause the drug delivery 80 from the drug container 60, there is substantially no relative movement between the container 10 of the reusable actuator 1 and the housing 62 of the drug container 60.

For example, the container 10 and the housing 62 of the drug container 60 may be assembled into a case of a drug delivery device, and fixed and clamped by the case, such that when the actuating element 20 applies the force to the stopper 64 to cause the drug delivery 80 from the drug container 60, there is substantially no relative movement between the container 10 and the housing 62. The drug delivery device may also comprise a power supply for the electrochemical pump of the reusable actuator 1.

On the other hand, the container 10 may have a diameter larger than that of an open end of the housing 62 and the actuating element 20 may have a diameter smaller than that of said open end, such that the reusable actuator 1 can be disposed at said open end of the housing 62, while avoiding the container 10's entering into the drug container 60 and allowing the actuating element 20 to protrude into the drug container 60 and apply the force to the stopper 64. Further, a flange structure may be formed at said open end of the housing 62, such that the reusable actuator 1 can be placed onto the flange structure of the housing 62, and then the reusable actuator 1 and the drug container 60 can be assembled into the case of the drug delivery device together.

According to certain embodiments of the present invention, the drug container 60 is a syringe or a cartridge. In some examples, the stopper 64 is a rubber stopper.

While preferred embodiments of the present invention have been shown and described herein, it will be obvious to those skilled in the art that such embodiments are provided by way of example only and can be implemented in combinations. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A reusable actuator for use with a drug container including a stopper, the reusable actuator comprising:

a container having a closed end, an open end, and a sidewall extending therebetween in a longitudinal direction;

an electrochemical gas-generating unit comprising an electrode, disposed at the closed end of the container and configured to generate a gas directly into an actuator interior defined in the container;

an actuating element disposed at and closing the open end of the container, the actuating element being a telescopic or bellow-type structure, or being a balloon the actuating element being movable relative to the container in the longitudinal direction by a gas pressure generated by the electrochemical gas-generating unit, such that the actuating element applies a force to the stopper to cause a drug delivery from the drug container; and a retracting mechanism comprising (i) a valve configured to release at least a portion of the generated gas from the actuator interior, and (ii) a gas converting member disposed within the actuator interior and configured to chemically convert the released gas to facilitate pressure reduction, thereby actively assist a retraction of the actuating element for reuse.

2. The reusable actuator of claim 1, wherein at least part of the actuating element is sleeved inside the container.

3. The reusable actuator of claim 2, wherein the telescopic structure includes a plurality of segments configured to extend and retract telescopically with respect to one another.

4. The reusable actuator of claim 2, wherein the container is a cylindrical container and the actuating element is a rod or has a tubular structure, at least part of the rod or tubular structure being sleeved inside the container.

5. The reusable actuator of claim 3, further comprising an O-ring sealably disposed between an outermost segment of the plurality of segments and the container.

6. The reusable actuator of claim 4, further comprising an O-ring sealably disposed between the rod or tubular structure and the container.

7. The reusable actuator of claim 1, wherein the gas converting member includes a gas converting catalyst.

8. The reusable actuator of claim 7, wherein the gas converting catalyst is coated on the container, the actuating element, or both.

9. The reusable actuator of claim 1, wherein the gas converting member is a platinum foam.

10. The reusable actuator of claim 5, wherein the retracting mechanism includes a resilient member for assisting the retraction of the plurality of segments for reuse.

11. The reusable actuator of claim 6, wherein the retracting mechanism includes a resilient member for assisting the retraction of the rod or tubular structure for reuse.

12. The reusable actuator of claim 10, wherein the resilient member is disposed in or outside the actuator interior.

13. The reusable actuator of claim 10, wherein the resilient member is a spring.

14. The reusable actuator of claim 11, wherein the resilient member is disposed in or outside the actuator interior.

15. The reusable actuator of claim 11, wherein the resilient member is a spring.

16. A drug delivery device comprising:

the reusable actuator of claim 1; and the drug container, wherein the drug container further includes a housing, the stopper being disposed within the housing, wherein the container of the reusable actuator is connected to the housing, and wherein the actuating element of the reusable actuator is abuttedly connected to the stopper of the drug container.

17. The drug delivery device of claim 16, wherein the container of the reusable actuator is so connected to the housing that when the actuating element applies the force to the stopper to cause the drug delivery from the drug container, there is substantially no relative movement between the container of the reusable actuator and the housing.

* * * * *